US010887076B2

(12) United States Patent
Lee et al.

(10) Patent No.: US 10,887,076 B2
(45) Date of Patent: *Jan. 5, 2021

(54) RECEIVER WITH ENHANCED CLOCK AND DATA RECOVERY

(71) Applicant: Rambus Inc., Sunnyvale, CA (US)

(72) Inventors: Hae-Chang Lee, Los Altos, CA (US); Brian Leibowitz, San Francisco, CA (US); Jaeha Kim, Los Altos, CA (US); Jafar Savoj, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,303

(22) Filed: Aug. 23, 2019

(65) Prior Publication Data

US 2020/0052873 A1    Feb. 13, 2020

Related U.S. Application Data

(63) Continuation of application No. 15/949,898, filed on Apr. 10, 2018, now Pat. No. 10,432,389, which is a (Continued)

(51) Int. Cl.
*H04L 7/00*      (2006.01)
*H04L 25/06*     (2006.01)
(Continued)

(52) U.S. Cl.
CPC ..... *H04L 7/0016* (2013.01); *G06Q 10/06312* (2013.01); *G06Q 10/103* (2013.01);
(Continued)

(58) Field of Classification Search
CPC ............... H04B 1/0475; H03F 3/24
See application file for complete search history.

(56) References Cited

U.S. PATENT DOCUMENTS 5,293,405 A    3/1994  Gersbach et al.
5,384,551 A    1/1995  Kennedy et al.
(Continued)

FOREIGN PATENT DOCUMENTS

WO    WO-2003-065637 A1    8/2003
WO    WO-2009-040371 A1    4/2009

OTHER PUBLICATIONS

CN Office Action dated Sep. 29, 2012 in CN Application No. 200980102738.6. 13 pages.
(Continued)

*Primary Examiner* — Shuwang Liu
*Assistant Examiner* — Gina M McKie

(57) ABSTRACT

A receiver device implements enhanced data reception with edge-based clock and data recovery such as with a flash analog-to-digital converter architecture. In an example embodiment, the device implements a first phase adjustment control loop, with for example, a bang-bang phase detector, that detects data transitions for adjusting sampling at an optimal edge time with an edge sampler by adjusting a phase of an edge clock of the sampler. This loop may further adjust sampling in received data intervals for optimal data reception by adjusting the phase of a data clock of a data sampler such a flash ADC. The device may also implement a second phase adjustment control loop with, for example, a baud-rate phase detector, that detects data intervals for further adjusting sampling at an optimal data time with the data sampler.

20 Claims, 4 Drawing Sheets

Related U.S. Application Data continuation of application No. 15/209,529, filed on Jul. 13, 2016, now Pat. No. 9,973,328, which is a continuation of application No. 14/563,626, filed on Dec. 8, 2014, now Pat. No. 9,419,781, which is a continuation of application No. 12/812,720, filed as application No. PCT/US2009/000687 on Jan. 30, 2009, now Pat. No. 8,929,496.

(60) Provisional application No. 61/063,264, filed on Feb. 1, 2008.

(51) Int. Cl.
*G06Q 10/06* (2012.01)
*G06Q 10/10* (2012.01)
*H04L 7/033* (2006.01)
*H04L 25/03* (2006.01)
*H04L 27/00* (2006.01)

(52) U.S. Cl.
CPC ............ *H04L 7/0062* (2013.01); *H04L 7/033* (2013.01); *H04L 7/0331* (2013.01); *H04L 25/062* (2013.01); *H04L 7/0004* (2013.01); *H04L 7/0334* (2013.01); *H04L 2025/0349* (2013.01); *H04L 2027/004* (2013.01); *H04L 2027/0067* (2013.01); *H04L 2027/0069* (2013.01)

(56) References Cited

U.S. PATENT DOCUMENTS

| | | | |
|---|---|---|---|
| 5,635,934 | A | 6/1997 | Brown |
| 5,703,853 | A | 12/1997 | Horigome et al. |
| 5,850,422 | A | 12/1998 | Chen |
| 5,959,563 | A | 9/1999 | Ring |
| 5,999,056 | A | 12/1999 | Fong |
| 6,005,893 | A | 12/1999 | Hyll |
| 6,038,266 | A | 3/2000 | Lee et al. |
| 6,046,630 | A | 4/2000 | Kim |
| 6,282,690 | B1 | 8/2001 | McClellan et al. |
| 6,459,394 | B1 | 10/2002 | Nadi et al. |
| 6,570,916 | B1 | 5/2003 | Feldbaumer et al. |
| 6,624,688 | B2 | 9/2003 | Jaussi et al. |
| 6,658,054 | B1 | 12/2003 | Kuribayashi et al. |
| 6,717,995 | B2 | 4/2004 | Zvonar |
| 6,771,725 | B2 | 8/2004 | Agazzi et al. |
| 6,888,905 | B1 | 5/2005 | Cheah et al. |
| 6,992,855 | B2 | 1/2006 | Ehrlich |
| 7,058,150 | B2 | 6/2006 | Buchwald et al. |
| 7,173,993 | B2 | 2/2007 | Engl et al. |
| 7,315,596 | B2 | 1/2008 | Payne et al. |
| 7,325,175 | B2 | 1/2008 | Momtaz |
| 7,397,876 | B2 | 7/2008 | Cranford, Jr. et al. |
| 7,406,135 | B2 | 7/2008 | Cranford, Jr. et al. |
| 7,471,691 | B2 | 12/2008 | Black et al. |
| 7,489,739 | B2 | 2/2009 | Dally |
| 7,589,649 | B1 | 9/2009 | Aga et al. |
| 7,639,736 | B2 | 12/2009 | Farjad-rad |
| 7,639,737 | B2 | 12/2009 | Palmer |
| 7,720,141 | B2 | 5/2010 | Fang et al. |
| 7,961,817 | B2 | 6/2011 | Dong et al. |
| 8,036,300 | B2 * | 10/2011 | Evans .................. H03L 7/07 375/276 |
| 8,107,573 | B2 | 1/2012 | Chang |
| 8,306,104 | B2 | 11/2012 | Agazzi et al. |
| 8,446,940 | B2 | 5/2013 | Farjad-rad |
| 8,478,554 | B1 | 7/2013 | Sheng |
| 9,036,764 | B1 | 5/2015 | Hossain et al. |
| 2002/0044618 | A1 | 4/2002 | Buchwald et al. |
| 2003/0195714 | A1 | 10/2003 | Jeddeloh |
| 2004/0161068 | A1 | 8/2004 | Zerbe et al. |
| 2004/0246034 | A1 | 12/2004 | Daishin et al. |
| 2005/0047500 | A1 | 3/2005 | Gupta et al. |
| 2005/0108600 | A1 | 5/2005 | Arguelles |
| 2005/0180536 | A1 | 8/2005 | Payne et al. |
| 2005/0271137 | A1 | 12/2005 | Kolze et al. |
| 2005/0271169 | A1 | 12/2005 | Momtaz et al. |
| 2006/0002497 | A1 | 1/2006 | Zhang |
| 2006/0140321 | A1 | 6/2006 | Tell et al. |
| 2006/0251195 | A1 | 11/2006 | Chen et al. |
| 2006/0256892 | A1 | 11/2006 | Momtaz |
| 2006/0280240 | A1 | 12/2006 | Kikugawa et al. |
| 2007/0002942 | A1 | 1/2007 | Simpson et al. |
| 2007/0110199 | A1 | 5/2007 | Momtaz et al. |
| 2007/0195874 | A1 | 8/2007 | Aziz et al. |
| 2007/0230640 | A1 | 10/2007 | Bryan et al. |
| 2007/0253475 | A1 | 11/2007 | Palmer |
| 2009/0076939 | A1 | 3/2009 | Berg et al. |
| 2010/0309791 | A1 | 12/2010 | Fuller et al. |
| 2012/0269305 | A1 | 10/2012 | Hogeboom et al. |
| 2017/0033918 | A1 * | 2/2017 | Hossain ................ H04L 7/0087 |
| 2018/0287829 | A1 | 10/2018 | Stojanovic et al. |

OTHER PUBLICATIONS

EP Communication dated Jul. 17, 2013 in EP Application No. 09708941.1. 4 pages.
EP Communication Pursuant to Article 94(3) EPC (Examination Report) for Appln. No. 09708941.1 dated Feb. 26, 2016. 7 Pages.
EP Communication Pursuant to Article 94(3) EPC dated May 4, 2017 re: EP Appln. No. 09708941.1. 7 Pages.
EP Office communication pursuant to Rules 161(1) and 162 EPC dated Sep. 14, 2010, re EP Application No. 09708941.1. 2 pages.
EP Response dated Nov. 13, 2017 in Response to the Official Communication Pursuant to Article 94(3) EPC dated May 4, 2017 for EP Appln. No. 09708941.1. 20 Pages.
EP Response dated Mar. 12, 2014 in EP Application No. 09708941. 1, Includes New Description pp. 1, 1a, and 15. 9 pages.
EP Response With EP Appln. No. 09708941.1 filed on Sep. 7, 2016 in Response to the Official Communication Pursuant to Article 94(3) EPC dated Feb. 26, 2016. 20 Pages.
Harwood, M. et al., "12.5Gb/s SerDes in 65nm CMOS Using a Baud-Rate ADC with Digital Receiver Equalization and Clock Recovery", ISSCC 2007/Session24/Multi-GB/s Transceivers/24.1. 10 Pages.
Harwood, M. et al., "A 12.5GB/s SerDes in 65nm CMOS Using a Baud Rate ADC with Digital RX Equalization and Clock Recovery", 2007 IEEE International Solid-State Conference. 18 Pages.
Meghelli et al., "A 10Gb/s 5-Tap-DFE/4-Tap-FFE Transceiver in 90nm CMOS", ISSCC 2006/Session4/Gigabit Transceivers/4.1, 2006 IEEE International Solid-State Circuits Conference. pp. 10.
Napier, Tom, "Flash ADC Takes the Uncertainty Out of High-Speed Data Recovery," Internet Citation XP002160853, URL: http://www.ednmag.com/ednmag/reg/1998/090198/18ms399.htm. Retrieved Feb. 20, 2001. 5 pages.
PCT Preliminary Examination Report dated Oct. 5, 2011 re Int'l. Application No. PCT/US09/00687. 7 Pages.
Ramin Farjad-Rad et al., "A 0.3-um CMOS 8-Gb/s 4-PAM Serial Link Transceiver", IEEE Journal of Solid-State Circuits, vol. 35, No. 5, May 2000, pp. 757-764. 8 Pages.
U.S. Appl. No. 15/949,898, filed Apr. 10, 2018 U.S. Pat. No. 10,432,389.
U.S. Appl. No. 15/209,529, filed Jul. 13, 2016 U.S. Pat. No. 9,973,328.
U.S. Appl. No. 14/563,626, filed Dec. 8, 2014 U.S. Pat. No. 9,419,781.
U.S. Appl. No. 12/812,720, filed Jul. 13, 2010 U.S. Pat. No. 8,929,496.

* cited by examiner

RECEIVER WITH ENHANCED CLOCK AND DATA RECOVERY

CROSS-REFERENCE TO RELATED APPLICATIONS

The present application is a continuation of U.S. Utility application Ser. No. 15/949,898, filed on Apr. 10, 2018, which is a continuation of U.S. Utility application Ser. No. 15/209,529, filed on Jul. 13, 2016 (now U.S. Pat. No. 9,973,328), which is a continuation of U.S. Utility application Ser. No. 14/563,626, filed on Dec. 8, 2014, (now U.S. Pat. No. 9,419,781), which is a continuation of U.S. Utility patent application Ser. No. 12/812,720, filed on Jul. 13, 2010 (now U.S. Pat. No. 8,929,496), which is a national stage entry under 35 U.S.C. § 371 of Patent Cooperation Treaty (PCT) Application No. PCT/US09/00687, filed Jan. 30, 2009. The aforementioned patent applications in turn claim priority to U.S. Provisional Application No. 61/063,264, filed Feb. 1, 2008. Each of these aforementioned applications was filed on behalf of first-named inventor Hae-Chang Lee and was entitled RECEIVER WITH ENHANCED CLOCK AND DATA RECOVERY; each of the aforementioned patent applications is hereby incorporated herein by reference.

BACKGROUND ART

The performance of conventional digital systems is limited by the transmission interconnection between integrated circuits. In such systems, a transmitter sends data onto a channel by setting a signal parameter of an output signal, such as current or voltage, to one of a plurality of discrete values during each of a succession of intervals referred to herein as data intervals. The data intervals are regulated by a transmitter clock. The data is in turn received by a receiver on the channel. The receiving IC device needs to recognize the discrete values set by the transmitter in the data intervals so it may be used in the receiving IC device. To do so, a receiving device will typically utilize a clock to regulate the timing of the receipt of the data of the data intervals. In a case when a transmit clock signal is not sent with the data signal from the transmitting device, a receiver clock may be generated at the receiving device. This may be accomplished during receiver operations from the characteristics of the received signal in a process typically referred to as clock and data recovery. Greater accuracy in the recovery of the clock signal from the data signal under higher data transmission speeds can yield more accurate data reception.

It would be desirable to implement receivers with components in such systems in a manner that improves circuit design while effectively maintaining or improving data throughput.

BRIEF DESCRIPTION OF DRAWINGS

The present technology is illustrated by way of example, and not by way of limitation, in the figures of the accompanying drawings, in which like reference numerals refer to similar elements including.

DETAILED DESCRIPTION

Figure 1:
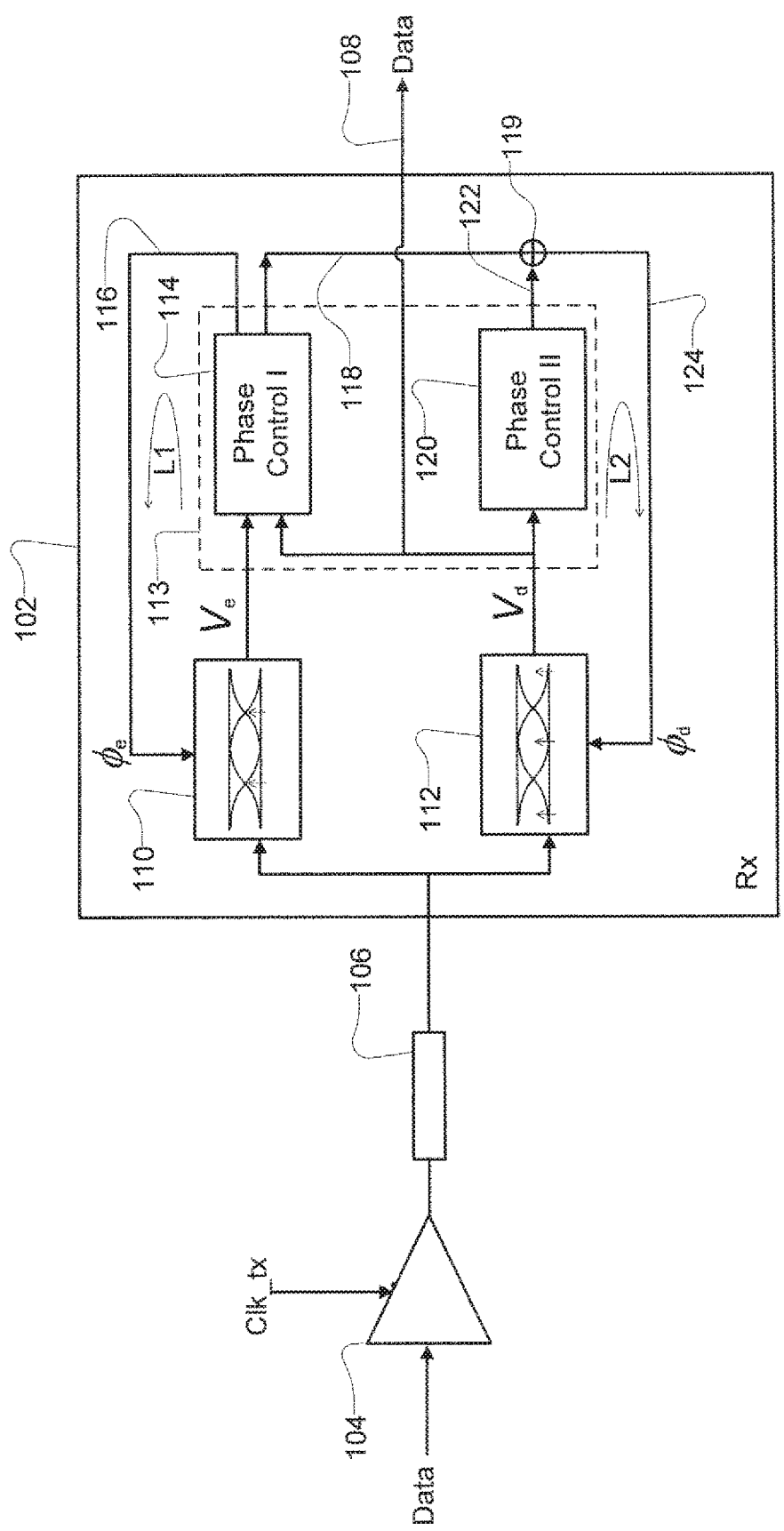
FIG. 1 is a block diagram of components of a data system with a receiver having multiple phase control loops according to an embodiment of the present enhanced clock data recovery technology.

A receiver 102, such as the enhanced clock and data recovery receiver according to one embodiment of the present technology is illustrated in a data system of FIG. 1. The data system will typically include at least one transmitter 104. Transmitter 104 transmits data onto the signal path of a channel 106. Transmission of data is regulated by a transmit clock signal (shown as "Clk_tx" in FIG. 1) that is coupled with the transmitter 104. Signal path of the channel 106 may be a single ended signal path or differential signal paths, for example. Thus, the transmitter may be a differential signal transmitter or a single ended signal transmitter. Data signal 108 is a digital signal produced from the signal of the channel 106 and represents the recovered data that was transmitted from the transmitter 104.

In the embodiment of FIG. 1, the receiver 102 typically includes edge sampler 110, data sampler 112, and one or more clock and data recovery elements 113. In the present embodiment, the clock and data recovery elements at least include a first phase controller 114 and a second phase controller 120. The data receiver 102 produces the data signal 108 with recovered data that was received by receiver 102 from the channel 106 based on the operations of the clock and data recovery elements 113.

In the illustrated embodiment, edge sampler 110 is configured to sample the signal(s) from the channel 106 to produce edge values thereof such as a digital value. To this end, edge sampler 110 operations are regulated by an edge clock signal 116 (also shown as "$\phi_e$" in FIG. 1). Edge clock signal 116 is generated to time sampling operations of edge sampler 110 at or near the data transition times or expected data transition times (e.g., between each successive data interval) of the signal received from the channel 106. Thus, values produced by edge sampler 110 are edge values (shown in FIG. 1 as $V_e$) that may be taken between successive data intervals of the signal transmitted on the channel 106 by transmitter 104. Edge sampler 110 may include, for example, a track and hold circuit and/or one or more comparators arranged to detect a signal level of a data transition of the channel 106 and to compare the signal with a threshold value or reference voltage in the determination of one or more edge values $V_e$ from the detected signal level of the channel 106.

In the embodiment, data sampler 112 is configured to sample the signal(s) from the channel 106 to produce data values thereof such as a digital data value. To this end, data sampler 112 operations are regulated by a data clock signal 124 (also shown as "$\phi_d$" in FIG. 1). Data clock signal 124 is generated to time sampling operations of data sampler 112 at or near a central portion of the successive data interval times of the signal received from the channel 106. Thus, values produced by data sampler 112 are data values (shown in FIG. 1 as $V_d$) that may be taken within each successive data interval of the signal transmitted on the channel 106 by transmitter 104. Data sampler 112 may include, for example, a track and hold circuit and/or one or more comparators arranged to detect a signal level of a data interval of the channel 106 and to compare the signal with one or more threshold values in the determination of one or more data values $V_d$ from the detected signal level of the channel 106. By way of further example, data sampler 112 may also include a bank of comparators for comparing the detected signal level detected from the channel with multiple threshold values, such as a different threshold for each comparator. For example, the sampler may include a direct conversion analog-to-digital converter, parallel analog-to-digital converter or a flash analog-to-digital converter. Output signals of the bank of comparators may, for example, be utilized in evaluating the detected signal levels for determining the data signal 108 received by the receiver 102. Optionally, embodiments of the data sampler of the present technology may also include one or more receive equalization components such as a partial response decision feedback equalizer ("prDFE") or decision feedback equalizer ("DFE") in conjunction with the clock and data recovery elements for further improving the determination of the data of data signal 108 in a manner that may compensate for inter-symbol interference ("ISI") in the transmitted data signal on the channel 106. Some embodiments may also include such equalizers operating on the edge path in conjunction with the edge sampler 110.

In the embodiment of FIG. 1, the first phase controller 114 serves as a phase detection element to assist in the generation and/or adjustment of a phase of the edge clock signal $\phi_e$ to align its phase for sampling at a data transition time between data intervals such as an optimal edge time. Optionally, first phase controller may also assist in the generation and/or adjustment of a phase of the data clock signal $\phi_d$ to align its phase for sampling at a desired data interval time within the data intervals. Although not shown, it will be understood that the generation of the edge clock signal (as well as the data clock signal) may also involve additional clock generation circuit elements such as oscillators, phase lock loops, delay lock loops, phase mixers, etc., so that the clock signals will oscillate at the desired frequency and can be phase adjusted by the adjustment values implemented with the technology described herein.

The first phase controller 114 may be a circuit coupled with edge sampler 110 to accept, as an input signal, edge values $V_e$ produced by the edge sampler 110. The first phase controller may also be coupled with the data sampler 112 to accept, as an input signal, data values $V_d$. The first phase controller 114 may detect the condition of the phase of the edge clock signal $\phi_e$ by evaluating the edge values and/or data values and setting a edge phase component 116 or variable associated with controlling of the phase of the edge clock signal $\phi_e$. The evaluation and output of the first phase controller may also be implemented for adjusting a first data phase component 118 or variable associated with controlling of the phase of the data clock signal $\phi_d$. The evaluation of the first phase controller 114 may involve a bang-bang phase detection method such as a method of a bang-bang phase detector or, for example, an Alexander phase detector. Such an evaluation may also involve a linear phase detection method such as a method of a linear phase detector. Other phase adjustment or detection methods based on edge sampling may also be employed.

Optionally, once an edge phase component is determined for setting or adjusting the phase of the edge clock signal to an optimal phase for transition or edge sampling, the edge phase component 116 may also be utilized to derive the first data phase component 118 by, for example, adjusting the edge phase component 116 to account for the phase difference between the moment for edge sampling and the moment for data sampling (e.g., half of the time of the data interval or unit interval.) A fixed signal value (not shown) associated with half of the period of the data interval may be implemented for this purpose. This may be implemented by the first phase controller 114 as illustrated in FIG. 1 or it may be implemented in conjunction with another suitable circuit element such as with an adder or a modulo adder.

As a potential benefit of employing data transition or edge information such as edge values $V_e$ in the method of the phase controller 114, the phase controller is able to make timing decisions for making adjustments to the phases of either or both of the edge clock signal and the data clock signal at every data transition of the received signal. This potentially permits a rapid response for making adjustments to the edge clock signal and/or the data clock signal to more quickly improve data reception accuracy when compared to phase detection involving only data samplers.

In the embodiment of FIG. 1, the second phase controller 120 serves as a phase detection element to assist in the generation and/or adjustment of a phase of the data clock signal $\phi_d$ to align its phase with a desired or optimal data sampling time within the data intervals. The second phase controller 120 may be a circuit coupled with data sampler 112 to accept, as an input signal, data values $V_d$ produced by the data sampler 112. The second phase controller 120 may detect the suitability of the phase of the data clock signal $\phi_d$ by evaluating the data values and setting a second data phase component 122 or variable associated with controlling of the phase of the data clock signal $\phi_d$. Optionally, the second data phase component 122 determined by the second phase controller 120 may be combined with the first data phase component 118 if determined by the first phase controller 114 so that the phase of the data clock signal $\phi_d$ may be set in conjunction with the operations of more than one phase controller or detector. By way of example, such a combination may be implemented in combiner 119, which may optionally be implemented with an adder or similar circuit component(s).

As illustrated in the embodiment of FIG. 1, the second phase controller 120 may not be coupled with an edge sampler such that it may not utilize edge values in its evaluation and adjustment of the data clock signal. Typically, the evaluation of the second phase controller 120 may involve a baud-rate phase detection method such as a method of a baud-rate phase detector. One example of a suitable baud-rate detector is a Mueller-Muller baud-rate detector or similar. Additionally or alternatively, the evaluation of the second phase controller 120 may employ a phase detection method such as a voltage margin measurement to directly measure the suitability of the data clock signal phase $\phi_d$ for sampling the data signal from the channel 106, and adjust the data clock signal phase to the most suitable value. Still further embodiments of the second phase controller 120 may employ a bit error rate ("BER") measurement method to minimize the BER, a timing margin measurement or other evaluation techniques for adjusting the phase of the data clock signal $\phi_d$ for improving the timing accuracy of the data sampling by the data sampler 112.

An implementation of the distinct or independent phase detectors can have a synergistic effect for improving data throughput with the receiver 102. The detectors may effectively provide clock and data recovery with at least dual phase control loops. As illustrated in FIG. 1, one control loop (shown as L1) may be implemented with the first phase controller to be closed around the edge sampler 110 in a manner that permits a fast phase detection to achieve high bandwidth tracking of the received data signal phase. Moreover, by utilizing data transition areas or edge-based information in the signal of the channel 106, timing decisions may be made where voltage gradients are steepest (e.g., a transmitted signal change from high to low or low to high) which may be less affected by noise compared to areas of the signal having smaller voltage gradients.

As further illustrated in FIG. 1, the second control loop (shown as L2) may be implemented with the second phase controller to be closed around the data sampler 112. The decision bandwidth of this second loop may be configured to be low so as to filter noisy phase information (e.g., to reduce the potential negative impact of noise in the data interval due to the low signal gradient levels within the significant portions of the data interval). A potential benefit of the configuration is to allow the first loop to provide fast and accurate transition phase information for enhanced clock and data recovery phase tracking bandwidth while the second loop corrects any aperture mismatch of the edge and data samplers and positions the effective sampling moment of the data sampler to a phase position for making the most accurate data decision (e.g., the center of the eye of the data interval) to minimize the bit error rate of the link. For example, given the quick response time of the first phase detector, initial operations may permit the first phase detector to lock to an optimal edge time and roughly adjust the data sampler to a rough but good data sampling time. Later, as the operation of the slower second phase detector begins to adjust the data sampling time, more refined and optimal setting of the data sampling clock may occur. Still later, any changes in the phase of the received data signal, for example due to jitter in Clk_tx of transmitter 104, can be quickly sensed by the first phase controller, allowing $\phi_d$ and $\phi_e$ to both track relatively fast changes in the received data phase, despite the relatively slow adjustment of $\phi_d$ by the second control loop.

Figure 2:
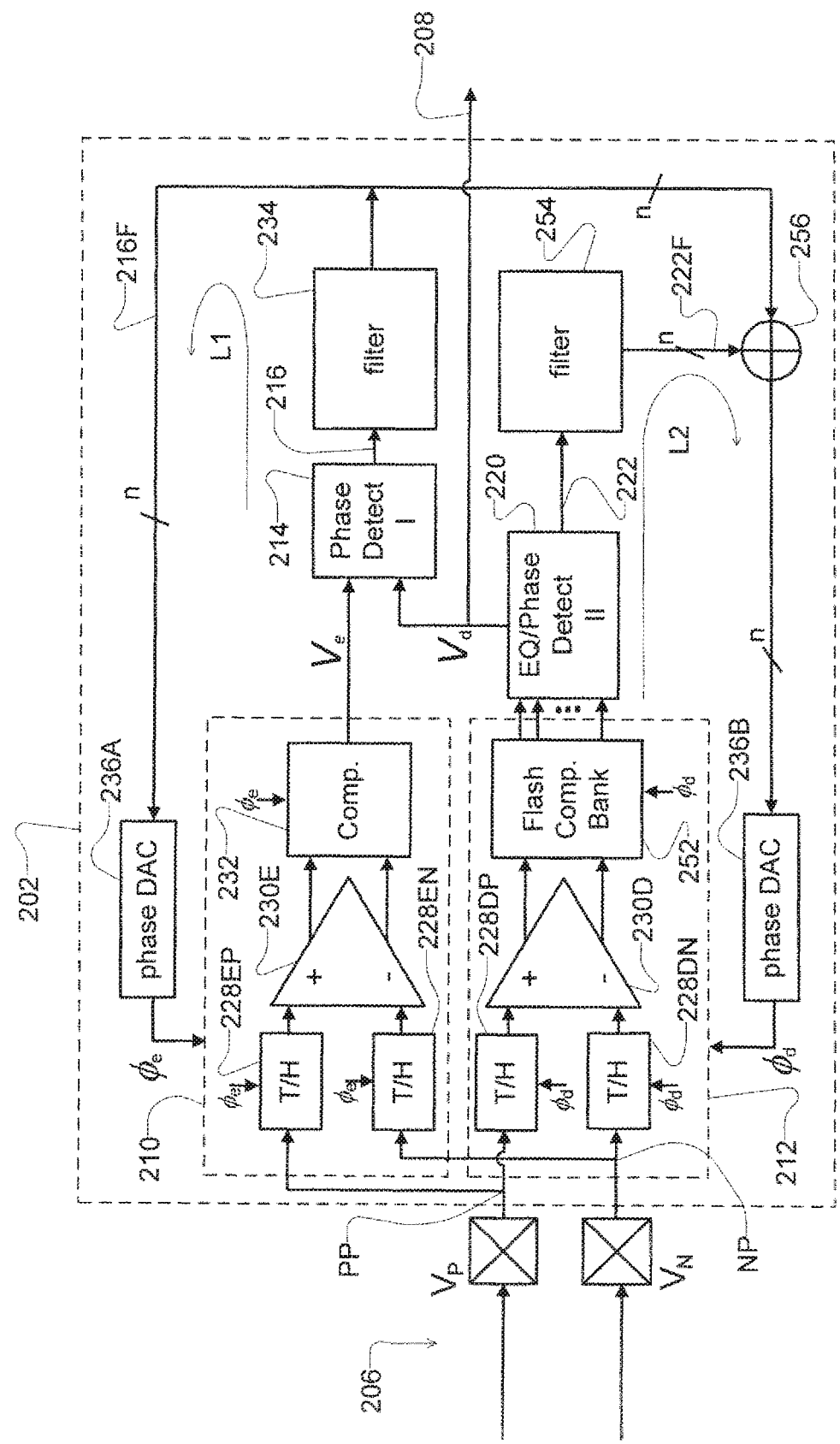
FIG. 2 illustrates a further embodiment of a receiver having an multiple phase control loops according to the present enhanced receiver technology.

FIG. 2 shows a receiver 202 embodiment similar to the receiver 102 embodiment of FIG. 1. The receiver 202 is implemented as a differential signal receiver from a differential signal path of channel 206 using positive and negative signal paths coupled with a positive signal terminal or node (shown as $V_p$ in FIG. 2) and a negative signal terminal or node (shown as $V_n$ in FIG. 2). Edge sampler 210 and data sampler 212 operate like the samplers of FIG. 1. However, in view of the differential nature of the input, each includes additional circuits.

For example, edge sampler 210 includes a positive track and hold circuit 228EP (each track and hold circuit is also shown as "T/H") for the positive signal path PP and a negative track and hold circuit 228EN for the negative signal path NP, each operating based on the edge clock signal $\phi_e$. The output of each track and hold circuit 228EP, 228EN is provided to a differential buffer or differential amplifier 230E. Differential edge comparator 232 produces edge values $V_e$ by comparison of the input from the differential amplifier 230E with one or more thresholds. The output of the edge sampler 210, shown as edge value $V_e$, may then be input to the first phase detector 214, which is comparable to features of the first phase controller discussed with respect to FIG. 1 in that it is configured to perform phase detection such as detecting the suitability of the phase of the edge clock signal for optimizing edge sampling as previously discussed. In this embodiment, the output (edge phase component 216) of the first phase detector 214, which may be a digital value of n bits, may be input to a first filter 234. Filter 234 may assist with frequency and/or phase corrections of the resulting edge clock signal and/or data clock signal. The filter may be either a first or second order digital loop filter which outputs the filtered edge phase component 216F. A phase domain digital-to-analog converter 236A (e.g., a digitally controlled phase mixer) may then change the filtered edge phase component 216F from a digital output of n bits to an analog phase of the edge clock signal $\phi_e$. Alternatively, in some embodiments the phase domain digital-to-analog converter may be implemented as a combination of a voltage digital-to-analog converter with a voltage-controlled delay line or as a combination of a current digital-to-analog converter with a current-controlled delay line.

Similarly, data sampler 212 includes a positive track and hold circuit 228DP (each track and hold circuit is also shown as "T/H") for the positive signal path and a negative track and hold circuit 228DN for the negative signal path, each operating based on the data clock signal $\phi_d$. The output of each track and hold circuit 228DP, 228DN is provided to a differential buffer or differential amplifier 230D in a manner similar to the components of the edge sampler 210. However, in this sampler unlike the edge sampler, a flash comparator bank 252 is implemented to operate on the output of the differential amplifier 230D. For example, the flash comparator bank 252 may be a differential signal flash analog-to-digital converter or similar circuit, which will typically have more than three differential comparators. Each differential comparator may be similar to the differential comparator 232 in the edge sampler 210 except that it will operate based on the data clock signal.

In this embodiment, the flash comparator bank 252 produces multiple signals based on comparisons with multiple or different thresholds. The outputs of the data sampler 210, may then be input to the second phase detector 220, which is comparable to features of the second phase controller discussed with respect to FIG. 1 in that it is configured to perform phase detection such as detecting the suitability of the phase of the data clock signal for optimizing data sampling as previously discussed. However, second phase detector 220 may also include elements of a equalizer, such as a DFE or prDFE equalizer as previously discussed, to assist in the recovery of data from the channel 206 in light of ISI to produce the received data signal 208. Thus, the second phase detector 220 outputs data values $V_d$ in addition to a second data phase component 222.

In this embodiment, the second data phase component 222 output from the second phase detector 220, which may be a digital value of n bits, may be input to a second filter 254. This filter may also assist with phase corrections of the resulting data clock signal. The filter is a first order digital loop filter which outputs the filtered second phase component 222F. In one embodiment, if a second order digital filter is implemented as first filter 234, then a first order digital loop filter may be implemented for the second filter 254.

In this embodiment, the filtered edge phase component 216F and the filtered second data phase component 222F are combined in adder 256. However, in the process the filtered edge phase component 216F may be adjusted to a first data phase component by adjusting its value by some function of the data interval period (e.g., half of the period) to compensate for the edge-based derivation of the edge phase component. A phase domain digital-to-analog converter 236B (e.g., a digitally controlled phase mixer) may then change the output of adder 256 from a digital output of n bits to an analog phase of the data clock signal $\phi_d$. Alternatively, in some embodiments the phase domain digital-to-analog converter may be implemented as a combination of a voltage digital-to-analog converter with a voltage-controlled delay line or as a combination of a current digital-to-analog converter with a current-controlled delay line.

Figure 3:
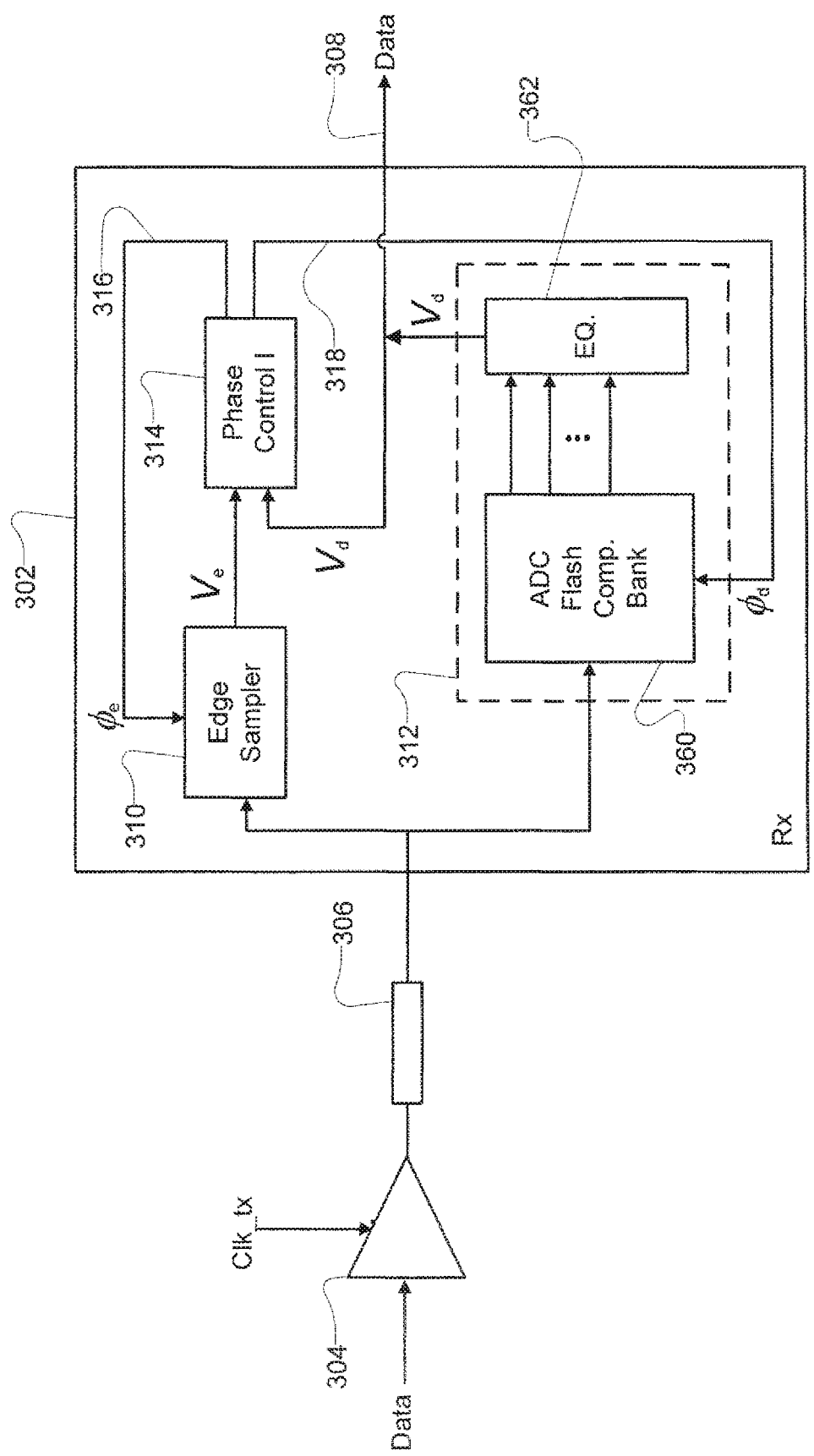
FIG. 3 shows another embodiment of a receiver having enhanced clock and data recovery elements with an analog-to-digital flash comparator bank of the present technology.

The data system illustrated in FIG. 3 shows a still further embodiment of the enhanced clock and data recovery technology with a receiver 302 coupled with a channel 306 and transmitter 304 in the recovery of data in data signal 308. In this embodiment, edge sampler 310 and first phase controller 314 may be configured and operate to produce edge phase component 316 and first data phase component 318 like the embodiments described with respect to FIGS. 1 and 2. Moreover, in this embodiment, data sampler 312, which is similar to the embodiment of FIG. 2, includes an analog-to-digital flash comparator bank 360. Such a bank will typically include more than three comparators. In this embodiment, the data clock signal $\phi_d$ utilized for timing operations of the analog-to-digital flash comparator bank 360 may be adjusted by the first phase controller 314 without further adjustments of a second phase controller or phase detector such as a baud rate phase detector. Thus, the timing of operations of the comparator bank 360 may be derived from clock recovery with edge-based phase detection. However, an additional phase controller or phase detector, such as the second phase controller or second phase detector of FIG. 1 or 2 may also be implemented in this embodiment as previously described. An equalizer 362, such as a DFE or prDFE equalizer, may be implemented for the recovery of data to compensate for ISI of the channel. Thus, the equalizer 362 may evaluate the input of the comparator bank in determining the recovered data values of the data signal 308 by a suitable method for such ISI compensation.

Figure 4:
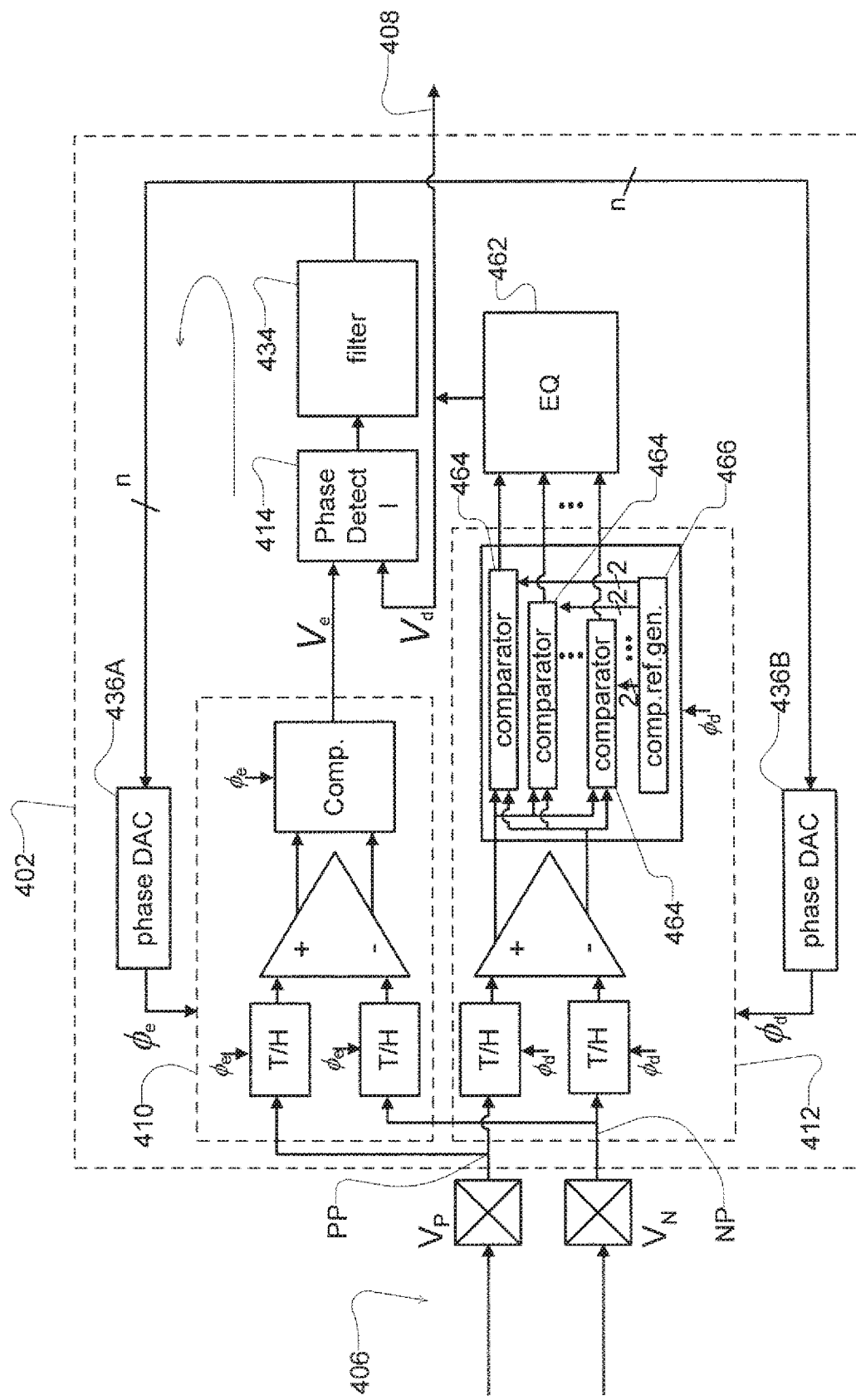
FIG. 4 is a block diagram of another embodiment of a receiver having enhanced clock and data recovery elements for reception of a differential signal according to the present technology.

A receiver 402 for a differential signal channel similar to the receiver embodiment of FIG. 3 is shown in FIG. 4. In this embodiment, the edge sampler 410, data sampler 412, first phase detector 414, first filter 434, phase domain digital-to-analog converters 436A, 436B are similar to these components described with respect to the receiver of FIG. 2. These components' operations are based on the positive and negative signals of the channel 406. Moreover, the equalizer 462 may be similar to the equalizer of FIG. 3 with respect to its recovery of data for the received data signal 408. In the embodiment shown in FIG. 4, the bank of comparators 252 includes differential signal comparators 464. Each differential signal comparator inputs the detected differential values from the positive and negative signal paths of the track and hold circuits or the optional differential buffer or differential amplifier. Each comparator may also be provided with a pair of unique threshold signals (e.g., voltage reference signals) for the positive signal path and the negative signal path of the comparator. The unique reference signals may be produced by a comparator differential reference generator 466 and input to each comparator. Each comparator essentially compares the received differential signals to make a threshold determination with respect to the threshold or reference signals. For example, each comparator may effectively subtract the threshold values from a result of subtracting the received negative signal path value from the positive signal path value. Produced signals of the bank of comparators may then be utilized by the equalizer to recover the received data from the transmitted signal. In an example embodiment, each comparator of the at least three comparators may each perform a comparison with a different threshold and one data sample at each data sample time.

In general, each of the circuits of the receiver 102 and/or the data system as discussed herein may be realized on one or more integrated chips or one or more integrated circuits. It may be part of the integrated circuits of digital processing devices, computers, computer peripherals, graphics processing devices, etc. By way of example, the data system and receiver may be implemented on a single integrated chip and may be implemented for transmitting data between functional circuit blocks of the integrated chip. By way of further example, the circuits may be implemented as part of a central processing unit or CPU as commonly employed in a digital computer or may be employed as an intermediary between the CPU and other circuit chips. Thus, circuits of the data system or the circuits of the receiver as discussed herein can be incorporated in the communication path between a processor such as a CPU and a cache memory. Thus, received data signals may be baseband data signals that are transmitted between circuit components of a common apparatus without modulation on a carrier wave or demodulation thereof. The technology may also be implemented as elements of point-to-point connections according to protocols such as PCI Express, Serial ATA and other protocols. By way of further example, the technology may also be implemented in high performance serial links (e.g., backplane links, PCI Gen3 lines, SATA Gen3/4, etc.) The technology can also be used with bus connections, i.e., arrangements in which the same signal is sent to plural devices connected to the same conductors. The receiver can even be implemented for parallel links such as buses or any other device implementing parallel communications. In other embodiments, the circuits may be an element of data input or output device controllers or the like, such as a memory controller and/or memory modules (e.g., dynamic random access memory and flash memory).

For example, in a memory controller embodiment, the memory controller generally acts as the device that sends data to the memory for a writing operation and receives data back from the memory for a reading operation. The receiver 102 may be implemented to receive signals sent from either or both of the memory and memory controller and may be realized in either or both of these devices.

In general, each of the circuits implemented in the technology presented herein may be constructed with electrical elements such as traces, capacitors, resistors, transistors, etc. that are based on metal oxide semiconductor (MOS) technology, but may also be implemented using other technology such as bipolar technology or any other technology in which a signal-controlled current flow may be achieved.

Furthermore, these circuits may be constructed using automated systems that fabricate integrated circuits. For example, the components and systems described may be designed as one or more integrated circuits, or a portion(s) of an integrated circuit, based on design control instructions for doing so with circuit-forming apparatus that controls the fabrication of the blocks of the integrated circuits. The instructions may be in the form of data stored in, for example, a computer-readable medium such as a magnetic tape or an optical or magnetic disk. The design control instructions typically encode data structures or other information or methods describing the circuitry that can be physically created as the blocks of the integrated circuits. Although any appropriate format may be used for such encoding, such data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can then use such encoded data to fabricate integrated circuits comprising one or more of the circuits described herein.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order but merely to assist in explaining elements of the technology. Additionally, although particular clock and data recovery elements have been explicitly labeled as such, it will be understood that additional elements of the receiver may be considered clock and data recovery elements. For example, some or more of the elements illustrated in the embodiments of the figures (e.g., the edge sampler and the data sampler) may also be considered clock and data recovery elements.

Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology. For example, although wired channels are explicitly discussed, wireless channels may also be implemented with the technology such that wireless transmissions may be made between chips using wireless transmitters and receivers. Such components may operate by, for example, infrared data signals or electromagnetic data signals sent between the circuit blocks of the technology. For example, the technology may be implemented as part of a PHY circuit that takes care of encoding and decoding between a digital domain and a modulation in the analog domain after the RF front end of a transmission system such as a 60 GHz system. Similarly, the channels may be implemented with capacitive, inductive and/or optical principles and can use components for such channels, such as the transmitter and receiver technology capable of transmitting data by such channels.

We claim:

1. An integrated circuit comprising:
    a receiver to receive a data signal, the receiver having a data sampler and an edge sampler;
    circuitry to generate a recovered clock from the data signal depending on outputs of the data sampler and the edge sampler;
    a first clock phase adjustment loop to adjust phase of an edge sampling clock for the edge sampler so as to align with expected symbol transition times of the data signal, the edge sampling clock being derived from the recovered clock;
    a second clock phase adjustment loop to adjust phase of a data sampling clock for the data sampler, the data sampling clock also being derived from the recovered clock;
    wherein the first clock phase adjustment loop and the second clock phase adjustment loop are to adjust phase independently of each other.

2. The integrated circuit of claim 1, wherein the first clock phase adjustment loop has a first loop bandwidth, and wherein the second clock phase adjustment loop has a second bandwidth that is less than the first bandwidth.

3. The integrated circuit of claim 1, wherein the integrated circuit comprises a Meuller-Meuller phase detector, and wherein the second clock phase adjustment loop is to adjust the phase of the data sampling clock in dependence on an output of the Meuller-Meuller phase detector.

4. The integrated circuit of claim 1, wherein the circuitry to generate the recovered clock comprises an Alexander phase detector, and wherein the first clock phase adjustment loop is to adjust the phase of the edge sampling clock in dependence on an output of the Alexander phase detector.

5. The integrated circuit of claim 4, wherein the integrated circuit comprises a Meuller-Meuller phase detector, and wherein the second clock phase adjustment loop is to adjust the phase of the data sampling clock in dependence on an output of the Meuller-Meuller phase detector.

6. The integrated circuit of claim 1, wherein the second clock phase adjustment loop is to detect a phase associated with at least one of a maximum signal voltage or a maximum voltage margin, and is to adjust the phase of the data sampling clock in dependence on the detected phase.

7. The integrated circuit of claim 1, wherein the data sampler comprises an analog-to-digital converter that is to produce N bits as the output of the data sampler, wherein the N bits represent magnitude of measured voltage, and wherein N is greater than three.

8. The integrated circuit of claim 7, wherein the integrated circuit further comprises circuitry to generate binary data samples, each from the N bits, wherein the circuitry to generate the recovered clock comprises an Alexander phase detector that is to receive the binary data samples and generate an output, and wherein first clock phase adjustment loop is to adjust the phase of the edge sampling clock in dependence on the binary data samples and in dependence on the output of the Alexander phase detector.

9. The integrated circuit of claim 7, wherein the integrated circuit further comprises an equalizer to equalize the N bits.

10. The integrated circuit of claim 1, wherein the integrated circuit further comprises circuitry to detect a minimum bit error rate in data samples output by the data sampler, and wherein the second clock phase adjustment loop is to detect a phase associated with the minimum bit error rate, and is to adjust the phase of the data sampling clock in dependence on the detected phase.

11. The integrated circuit of claim 1, embodied as a memory controller integrated circuit.

12. An integrated circuit comprising:
    a receiver to receive a data signal, the receiver having a data sampler and an edge sampler;
    circuitry to generate a recovered clock from the data signal depending on outputs of the data sampler and the edge sampler;
    a first clock phase adjustment loop to adjust phase of an edge sampling clock for the edge sampler so as to align with expected symbol transition times of the data signal, the edge sampling clock being derived from the recovered clock;
    a second clock phase adjustment loop to adjust phase of a data sampling clock for the data sampler, the data sampling clock also being derived from the recovered clock;
    wherein the first clock phase adjustment loop and the second clock phase adjustment loop are to adjust phase independently of each other; and
    wherein the data sampler comprises a flash analog-to-digital converter.

13. The integrated circuit of claim 12, wherein the first clock phase adjustment loop has a first loop bandwidth, and wherein the second clock phase adjustment loop has a second bandwidth that is less than the first bandwidth.

14. The integrated circuit of claim 12, wherein the circuitry to generate the recovered clock comprises an Alexander phase detector, and wherein the first clock phase adjustment loop is to adjust the phase of the edge sampling clock in dependence on an output of the Alexander phase detector.

15. The integrated circuit of claim 12, wherein the second clock phase adjustment loop is to detect a phase associated with at least one of a maximum signal voltage or a maximum voltage margin or a minimum bit error rate, and is to adjust the phase of the data sampling clock in dependence on the detected phase.

16. The integrated circuit of claim 12, wherein the flash analog-to-digital converter is to produce N bits as the output of the data sampler, wherein N is greater than three and the N bits represent magnitude of measured voltage, wherein the integrated circuit further comprises circuitry to generate binary data samples from the N bits, wherein the circuitry to generate the recovered clock comprises an Alexander phase detector that is to receive the binary data samples and generate an output in dependence on the binary data samples, and wherein first clock phase adjustment loop is to adjust the phase of the edge sampling clock in dependence on the binary data samples and in dependence on the output of the Alexander phase detector.

17. The integrated circuit of claim 16, wherein the integrated circuit further comprises an equalizer to equalize the N bits.

18. An integrated circuit comprising:
   a receiver to receive a data signal, the receiver having a data sampler and an edge sampler;
   circuitry to generate a recovered clock from the data signal depending on outputs of the data sampler and the edge sampler;
   a first clock phase adjustment loop to adjust phase of an edge sampling clock for the edge sampler so as to align with expected symbol transition times of the data signal, the edge sampling clock being derived from the recovered clock;
   a second clock phase adjustment loop to adjust phase of a data sampling clock for the data sampler, the data sampling clock also being derived from the recovered clock;
   wherein the first clock phase adjustment loop and the second clock phase adjustment loop are to adjust phase independently of each other; and
   wherein an update rate of the second clock phase adjustment control loop is slower than an update rate of the first clock phase adjustment control loop.

19. The integrated circuit of claim 18, wherein the circuitry to generate the recovered clock comprises a phase detector that is to detect when symbols carried by the data signal change logic state from a first logic state to a second logic state, wherein the first clock phase adjustment loop is to adjust the phase of the edge sampling clock in response to the detected change in logic state, wherein the integrated circuit further comprises circuitry to detect at least one of maximum signal voltage or maximum voltage margin or minimum bit error rate, and wherein the second clock phase adjustment loop is to adjust the phase of the data sampling clock in dependence on the detected at least one of maximum signal voltage or maximum voltage margin or minimum bit error rate.

20. The integrated circuit of claim 19, wherein the data sampler is to produce a set of N bits as the output of the data sampler, wherein N is greater than three and each set of the N bits represents magnitude of measured voltage, wherein the integrated circuit further comprises circuitry to generate binary data samples from respective sets of the N bits, wherein the phase detector is to receive the binary data samples and to detect the change in the logic state from the binary data samples, and wherein first clock phase adjustment loop is to adjust the phase of the edge sampling clock in dependence on an output of the phase detector.

* * * * *